United States Patent [19]

Makhlouf et al.

[11] 4,041,008

[45] Aug. 9, 1977

[54] LOW SMOKE DENSITY FIRE-RETARDANT RESINS

[75] Inventors: Joseph M. Makhlouf, Mars; Earl E. Parker, Allison Park, both of Pa.

[73] Assignee: PPG Industries, Inc., Pittsburgh, Pa.

[21] Appl. No.: 576,915

[22] Filed: May 12, 1975

[51] Int. Cl.$^2$ .............................................. C08K 3/22
[52] U.S. Cl. .................. 260/40 R; 260/861; 260/872
[58] Field of Search ................ 260/861, 40 R, 872

[56] References Cited

U.S. PATENT DOCUMENTS

| | | | |
|---|---|---|---|
| 3,153,005 | 10/1964 | Minter | 260/40 R |
| 3,264,372 | 8/1966 | Deichert | 260/861 |
| 3,631,224 | 12/1971 | Baum | 260/861 |
| 3,632,667 | 1/1972 | Baum | 260/861 |
| 3,714,113 | 1/1973 | Kingston | 260/40 R |
| 3,784,586 | 1/1974 | Thomas | 260/861 |
| 3,832,268 | 8/1974 | Smith | 260/861 |
| 3,894,115 | 7/1975 | Bacskai | 260/861 |

OTHER PUBLICATIONS

W. J. Connolly & A. M. Thornton, Modern Plastics, 43 (2), pp. 154, 155, 202, 1965.

*Primary Examiner*—Paul R. Michl
*Attorney, Agent, or Firm*—William J. Uhl

[57] ABSTRACT

Curable aliphatic polyester resin compositions formed from aliphatic unsaturated polycarboxylic acids and polyols and a crosslinking aliphatic vinyl monomer are disclosed. The degree of unsaturation in the polyesters is carefully controlled so that the resin can be cured to produce strong thermoset products. Resins of this nature can be filled with high levels of aluminum hydrate to give compositions that have high oxygen indices and very low smoke densities as measured by the National Bureau of Standards Smoke Chamber. Also, the resins are capable of room temperature curing.

16 Claims, 4 Drawing Figures

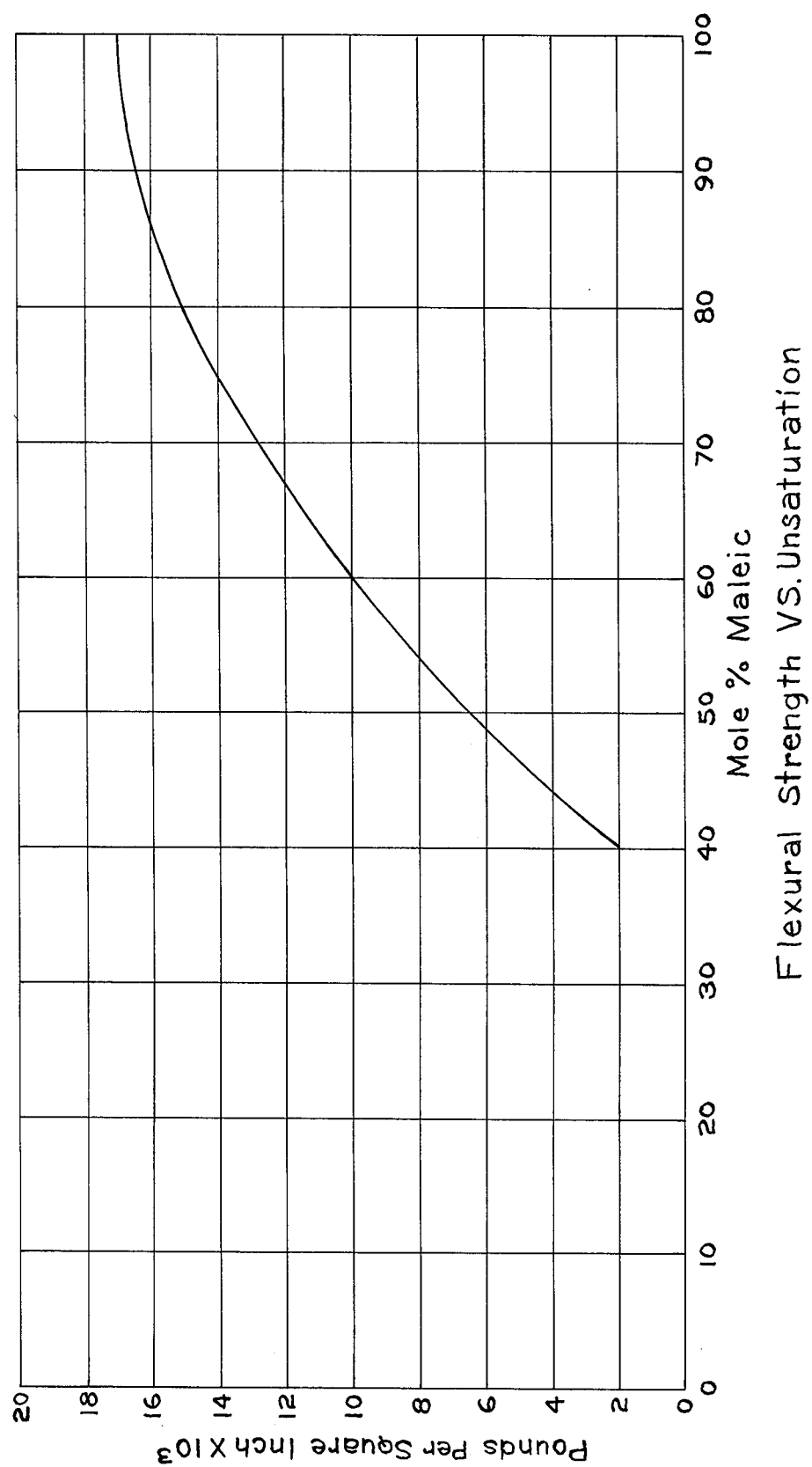
FIG.2 Flexural Strength VS. Unsaturation

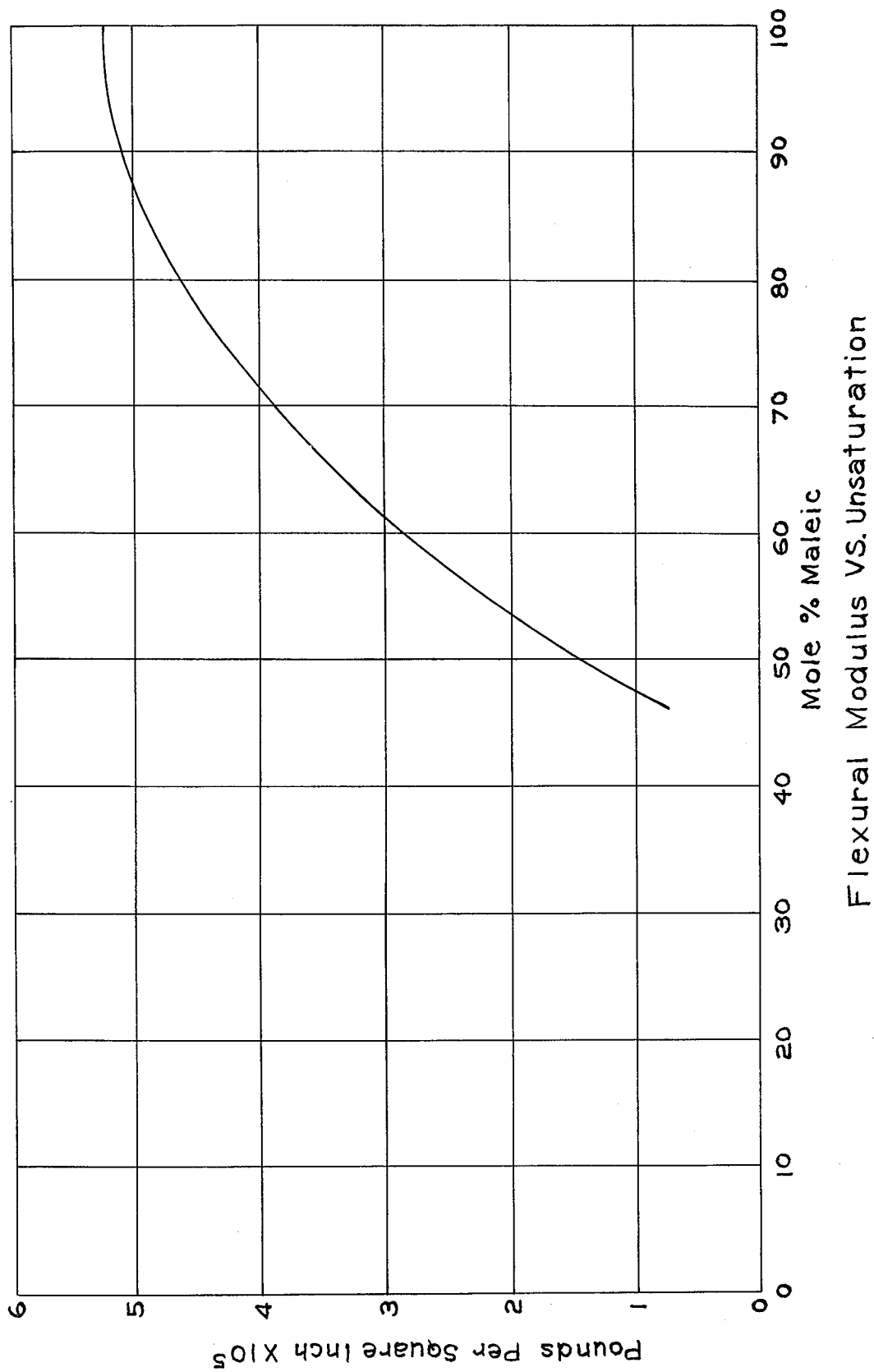

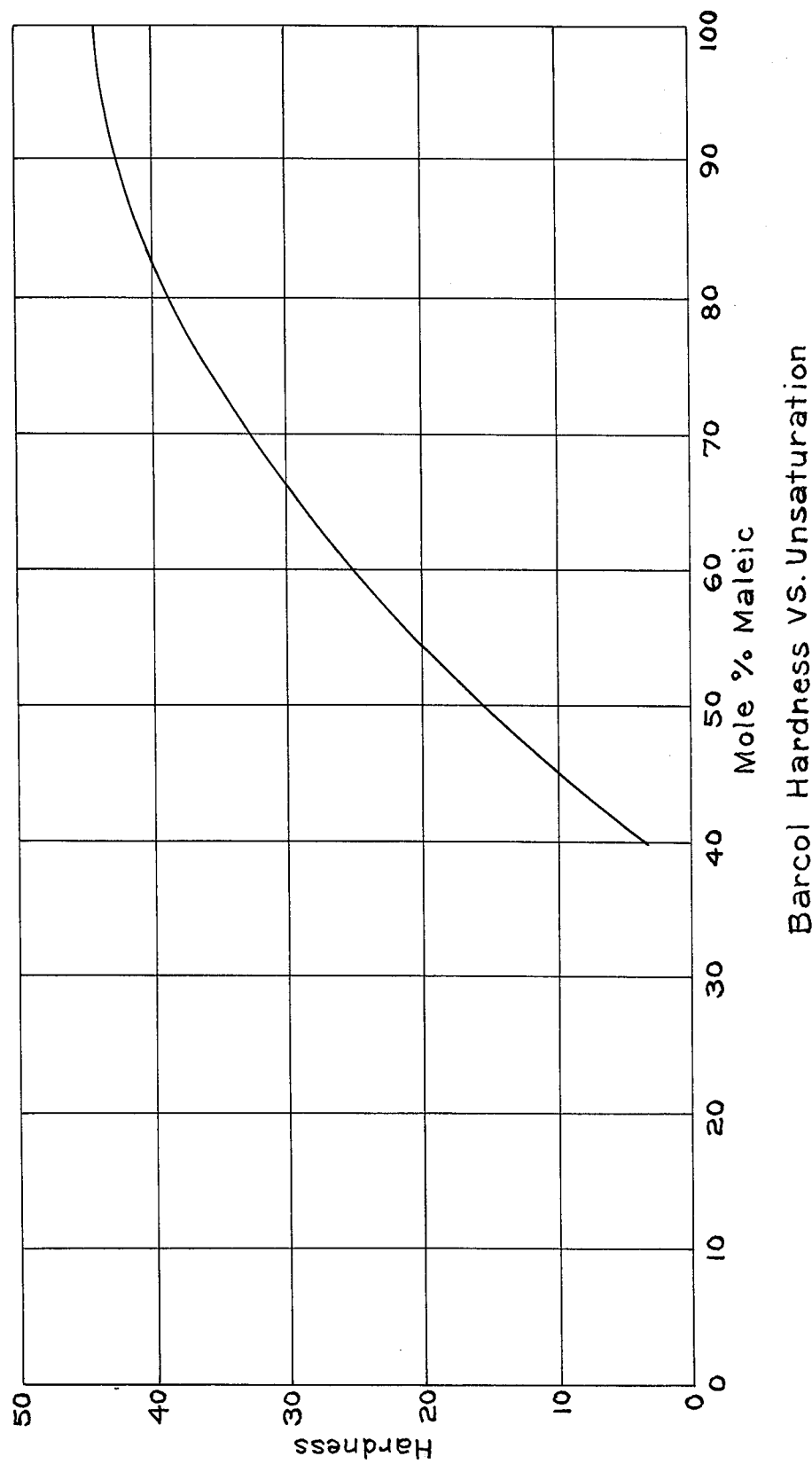

LOW SMOKE DENSITY FIRE-RETARDANT RESINS

BACKGROUND OF THE INVENTION

1. Field of the Invention

This invention is in the field of unsaturated polyesters curable with an unsaturated monomer, and more particularly, is in the field of low smoke density polyesters.

2. Brief Description of the Prior Art

Traditionally, fire-retardant polyesters have been made with chlorinated or brominated materials, or, in some cases, phosphorus-containing materials. These materials may be merely additives to the polyester or they may be actual reactants. Although polyesters prepared with such materials are fire-retardant in the sense that they have low flame spreads and are self-extinguishing, they unfortunately emit a thick, dense smoke when exposed to an open flame. The high smoke levels are, of course, undesirable and often are more serious than the fire itself.

We have found that high smoke levels are due not only to the presence of halogen-containing or phosphorus-containing materials in the polyester, but are also due to aromatic components in the cured polyester. Aromaticity may be introduced into the cured polyester from the crosslinking monomer or from the ingredients used to prepare the polyester itself. An example of an aromatic crosslinking monomer is styrene which is by far the most widely used crosslinking monomer. Examples of commonly used aromatic ingredients used to prepare the polyester are the various isomers of phthalic acid, and Bisphenol A.

We have found that completely aliphatic polyester resins made from unsaturated aliphatic polyesters cured with aliphatic vinyl crosslinking monomers such as methyl methacrylate produce very little smoke when cured thermosets are exposed to an open flame. Unfortunately, many of these all-aliphatic polyester thermosets are weak, having low flexural strength and flexural modulus.

The weakness of polyesters cured with aliphatic monomers such as methyl methacrylate is well known in the art. It is believed that the unsaturated polyesters and methyl methacrylate do not copolymerize readily and, therefore, give a composition in which some of the polyester remains unreacted in a mixture of polymethyl methacrylate and some loosely formed polyester-methyl methacrylate copolymer. See, for example, "Factors Affecting Durability of Glass-Reinforced Polyester Resins" by A. C. Smith and J. R. Lowry, *Plastics Technology*, June 1959, pages 42–56. This lack of strength and related properties due to poor copolymerization or curing has been a principal reason why methyl methacrylate has not been more widely used for the curing of unsaturated polyesters.

SUMMARY OF THE INVENTION

We have found that unsaturated polyesters can be fully cured or copolymerized with aliphatic crosslinking monomers such as methyl methacrylate to produce strong thermoset articles. The key to achieving complete curing is to use an unsaturated polyester having a high degree of ethylenic unsaturation. When these highly unsaturated polyesters are cured with an aliphatic vinyl crosslinking monomer such as methyl methacrylate, strong thermoset articles result. The cured resins produce little smoke when burned and when filled with aluminum hydrate have low flame spreads and have surprisingly high oxygen indices.

The resins of the present invention can be cured at elevated temperatures, that is, 82° C. and above, and can be made room temperature curable.

Besides resinous mixtures, cured thermoset articles are also included within the scope of the present invention. Particularly strong thermoset articles, useful as articles of construction, can be prepared by reinforcing the cured resinous products of the invention with fiber glass.

BRIEF DESCRIPTION OF THE DRAWINGS

FIG. 2 is a graph showing the effect of the degree of unsaturation in the polyester on flexural strength;

FIG. 3 is a graph showing the effect of the degree of unsaturation in the polyester on flexural modulus; and FIG. 4 is a graph showing the effect of the degree of unsaturation in the polyester on Barcol Hardness.

DETAILED DESCRIPTION

Figure 1:
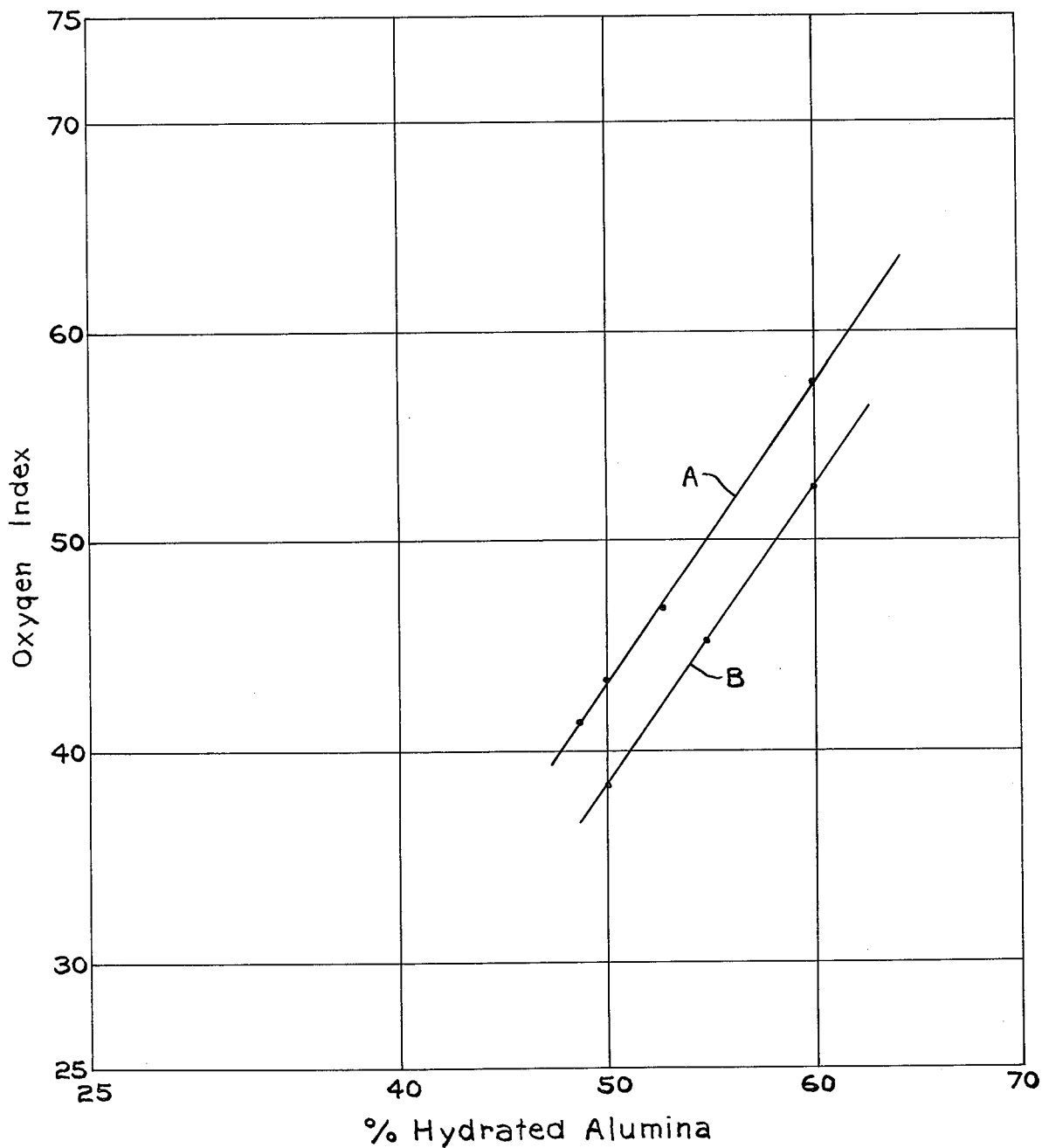
FIG. 1 is a graph showing the effect of hydrated alumina loadings on oxygen index of two polyester resins.

The present invention relates to a curable aliphatic polyester resin and to cured resinous products prepared therefrom. The resin comprises a mixture of an unsaturated aliphatic polyester and an aliphatic vinyl monomer copolymerizable with the polyester. The term "aliphatic" means the polyester resin of the present invention is essentially free of aromatic constituents, although a minor amount, for example, less than 2 percent by weight based on resin weight, of aromatic materials may be used as catalyst, accelerators, inhibitors and the like.

The unsaturated aliphatic polyesters are derived from condensing organic polycarboxylic acids having a functionality of at least 2 with organic polyols having a functionality of at least 2. The unsaturated component in the polyester is an alpha, beta-ethylenically unsaturated organic polycarboxylic acid and the equivalent ratio of alpha, beta-ethylenically unsaturated polycarboxylic acids to all other polycarboxylic acid components in the polyester is at least 1 to 1, and preferably at least about 2.5 to 1, and in certain cases, all the organic polycarboxylic acid components may be alpha, beta-ethylenically unsaturated.

The aliphatic polyesters of the present invention when cured with an aliphatic vinyl crosslinking monomer produce strong thermoset articles which, when subjected to an open flame, produce little smoke. The amount of smoke generated by burning a cured resinous sample of the invention can be determined by measuring the smoke density according to ASTM D-2843. Briefly, the testing procedure involves inserting a specimen of accurate, predetermined dimensions inside a smoke chamber. The chamber is substantially air-tight and contains a photocell in the ceiling and a standardized light source in the floor which cooperate with one another to measure the optical transmission through the height of the chamber. The specimen is then exposed to an open flame and burned, or, in another aspect of the test, the specimen can be subjected to a source of radiant heat and permitted to smolder. In both aspects of the test, the samples are subjected to combustion and the smoke that is generated is collected in the chamber. During the course of the test, which usually lasts about 20 minutes, the optical transmission is constantly recorded, and the minimum value is taken as a measure of the smoke density. The smoke density is a logrithmic function of the optical transmission as is shown by the following table:

Smoke Density ($D_m$)
Conversion of percent Transmittance to Smoke Density

| Percent Transmittance | $D_m$ |
|---|---|
| 75 | 16 |
| 42 | 50 |
| 17.5 | 100 |
| 3.0 | 201 |
| 0.52 | 301 |
| 0.090 | 401 |
| 0.016 | 501 |
| 0.0028 | 601 |
| 0.00049 | 701 |

Cured aliphatic polyesters of the present invention when burned as described in ASTM D-2843 have smoke densities of about 200 or less, preferably 100 or less. Smoke densities of about 100 are equivalent to optical transmissions of about 18 percent. At this level of transmission, one could at least see a lighted exit sign in case of a fire. As a point of comparison, highly aromatic systems such as styrene cured polyesters have smoke densities of 300 and above and often 500 and above. Aromatic, chlorinated and brominated self-extinguishing polyester resin systems have smoke density values of about 800 and above and further, emit toxic vapors of chlorine and bromine or related compounds. The aliphatic polyester resins of the present invention are not likely to emit effluents of such toxicity.

Besides generating little smoke when burned, the cured aliphatic polyester resins of the present invention are quite fire retardant as evidenced by their high oxygen indices and their low flame spreads when filled with about 50 percent by weight or more hydrated alumina.

The oxygen index is determined according to ASTM D-2863. In general terms, the oxygen index of a material is percentage by volume of oxygen in the atmosphere necessary to support combustion of the material. For example, air contains 21 percent by volume oxygen. If a material burned in air, it would have an oxygen index of 21 or lower. The higher the oxygen index of the material, the harder it is to get the sample to burn. Thus, the oxygen index is a measure of the fire retardance of the sample. Cured resinous materials of the invention containing hydrated alumina have oxygen indices of at least 35 and preferably at least 50 which is easily obtainable when the resin contains from about 50 to 75 percent by weight hydrated alumina filler. Hydrated alumina is a particularly desirable filler because, although it raises the oxygen index, it does not appreciably affect the smoke density.

Besides oxygen index, flame spread is another indication of fire retardance. The flame spread characteristics of the polyesters of the present invention can be determined according to the Underwriters' Tunnel Test (ASTM E-184).

According to the ASTM manual, the Underwriters' Tunnel Test is for evaluating the burning characteristics of building materials and is applicable to any type of building material. The purpose of the test is to determine the comparative burning characteristics of the material under test by evaluating the flame spread over its surface.

The test chamber is a horizontal duct, 17½ inches wide, 12½ inches high and 25 feet long. Red oak is the calibration standard and is arbitrarily assigned a value of 100. A value of 0 is assigned to asbestos. Other materials are reported proportionately.

It has been suggested that the following classifications be assigned to the various flame-spread ratings:

| Flame Spread | Classification |
|---|---|
| 0–25 | Class A, non-combustible |
| 25–75 | Class B, fire-retardant |
| 75 and up | Class C, combustible |

The Underwriters' Tunnel Test is a good measure of flame spread, however, the test is expensive to set up and to conduct.

There is a laboratory scale test which gives an indication of flame spread. The laboratory scale test is referred to as the Monsanto Tunnel Test and is described in *J. of Paint Technology*, 39, (511), 494 (Aug. 1967). In the Monsanto Tunnel Test, a sample 2 feet by 3¾ inches is slanted at an angle of about 45° from the horizontal. A specified heat source is burned at the bottom of the sample and the sample is then burned for four minutes. The flame spread or how far the flame spreads up the sample is reported.

It has been found that cured polyester resins of the invention have flame-spread ratings less than 50 as determined by the Monsanto Tunnel Test.

The polyesters of the present invention can be cured to form a strong, hard, thermoset article with an aliphatic vinyl crosslinking monomer such as methyl methacrylate. As has been mentioned above, this is very unusual since methyl methacrylate usually only gives partial cures with unsaturated polyesters resulting in weak thermosets of low hardness. Complete cures with aliphatic crosslinking monomers can be insured if the polyester contains a high degree of ethylenic unsaturation such as that specified above. Such resins completely cure with methyl methacrylate to produce strong thermoset articles of high hardness. The effect of unsaturation on strength and hardness can be seen in FIGS. 2, 3 and 4 which are plots of flexural strength (FIG. 2), flexural modulus (FIG. 3) and Barcol Hardness (FIG. 4) versus percent maleic unsaturation.

The polyester resins evaluated for the data depicted in FIGS. 2, 3 and 4 are described in Working Examples 35–41 infra. Briefly, the polyesters were ethylene, propylene, adipate, maleate polyesters in which the maleic anhydride to adipic acid mole ratio was varied over the range of 10–4 to 0–6. Fifty parts by weight of the various polyesters were cured with 50 parts by weight of methyl methacrylate and 7 parts by weight of N-vinyl pyrrolidone. FIGS. 2, 3 and 4 show that stronger, harder resins are obtained with higher levels of unsaturation indicating more complete curing at the higher levels of unsaturation. This trend with aliphatic curing agents such as methyl methacrylate is opposite to that observed with aromatic curing agents such as styrene. At high levels of unsaturation, styrene cured systems become increasingly embrittled and lose strength.

In view of the excellent strength and fire-retardant properties reported above, the cured polyester resins of the present invention are particularly desirable for use as materials of construction, that is, they can be used as molding resins or laminating resins, although, of course, they could be used as coating compositions. However, the resins have been particularly formulated for use as materials of construction such as automobile and truck body components, liners for truck walls, aircraft parts, boat hulls, plumbing fixtures, piping, duct work and the like.

The polycarboxylic acids used in the practice of the invention are aliphatic and preferably dibasic and have a high content of alpha, beta-ethylenic unsaturation, that is, the equivalent ratio of alpha, beta-ethylenically unsaturated polycarboxylic acid in the polyester to all other polycarboxylic acids is at least 1 to 1 and preferably at least 2.5 to 1. Of course, the entire polycarboxylic acid component can be alpha, beta-ethylenically unsaturated, and the present claims are intended to cover this embodiment.

Examples of alpha, beta-ethylenically unsaturated polycarboxylic acids are maleic acid, fumaric acid, aconitic acid, mesaconic acid, citraconic acid, itaconic acid and alkyl derivatives of such acids. The anhydrides of these acids where anhydrides exist are embraced within the term "acid" since the reaction products produced therefrom, that is, the polyesters, are the same. Maleic acid and fumaric acid are preferred acids.

Other polycarboxylic acids and anhydrides can, of course, be used. Examples would be acyclic polycarboxylic acid and anhydrides, preferably dibasic acids and anhydrides. Among the acyclic saturated dicarboxylic acids can be mentioned those which are saturated and which contain from about 2 to 10 carbon atoms such as succinic acid, adipic acid, suberic acid, and the like.

Polyesters prepared from symmetrical glycols such as ethylene glycol, neopentyl glycol and the like have a tendency to crystallize and to be only moderately soluble in crosslinking monomer. The incorporation of an acyclic saturated polycarboxylic acid in the polyester formulation reduces the tendency of the polyester to crystallize, makes the resin more soluble in crosslinking monomer and lowers the viscosity of the resultant resin.

The tendency of the polyester to crystallize can be minimized by incorporating a branched glycol into the formulation. However, alkyl branching had an adverse effect on oxygen index.

The effect of branching in the polyester chain on oxygen index can be seen in FIG. 1 which is a plot of oxygen index versus percent hydrated alumina content. The two plots in the figure represent different polyesters. Plot A represents an ethylene, propylene, maleate, adipate polyester prepared in the mole ratio of 9/2/8/2. Plot B represents a propylene-fumarate polyester prepared in a molar ratio of 11.5/10. Fifty parts by weight of the polyesters were combined with 50 parts by weight of methyl methacrylate, filled with hydrated alumina in the various percentages shown in FIG. 1 and cured as generally described in Examples 28–34 infra. The data in FIG. 1 shows that regardless of the hydrated alumina loading, the polyester resin A with less alkyl branching has a higher oxygen index than resin B.

The organic polyol component used to prepare the polyester is also aiphatic and preferably is difunctional. The polyol can be an alkylene glycol or an alkylene oxide glycol containing from 2 to 10 carbon atoms such as ethylene glycol, propylene glycol, butylene glycol, diethylene glycol, triethylene glycol, dipropylene glycol, neopentyl glycol or the like. Mixtures of polyols can obviously be used.

Also, in certain preferred embodiments, alcohols and polyols containing allyl or acrylic substitution can be included in the polyol component of the polyester. Examples include the monoallyl or diallyl ether of trimethylol propane, the monoallyl or diallyl ether of glycerol, the diallyl or triallyl ether of pentaerythritol. These components have been found to speed the cure of the polyesters cured with aliphatic monomers. In the embodiments where these allyl substituted alcohols and polyols are used, they should be used in amounts of up to 25 percent by weight based on total weight of the resin.

A minor amount of the polycarboxylic acid or polyol component, that is, less than about 15 percent by weight, may have a functionality greater than 2. This may be in the polyol component and can be glycerine, pentaerythritol, hexanetriol or trimethylol propane. Polyfunctional material may also be in the acid component and can be, for example, citric acid.

In producing polyesters from the organic polycarboxylic acids and polyols, the equivalent ratio of polyol components to acid components is generally from about 1 to 1.3:1. A slight excess of polyol is normally used because some is usually volatilized or decomposed during the esterification.

The aliphatic vinyl monomer copolymerizable with the polyester is an aliphatic material containing at least one

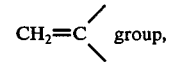

and preferably in the terminal position. Examples include esters of organic and inorganic acids, such as vinyl acetate, vinyl propionate, vinyl butyrate, vinyl isobutyrate, vinyl valerate, vinyl caproate, vinyl enanthate; methyl methacrylate, ethyl methacrylate, propyl methacrylate, butyl methacrylate, amyl methacrylate, hexyl methacrylate, heptyl methacrylate, octyl methacrylate, decyl methacrylate; methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate; allyl formate, allyl acetate, allyl propionate, allyl butyrate, allyl valerate, allyl caproate, allyl-3,5,5-trimethyl hexoate, allyl acrylate, allyl crotonate, allyl lactate, allyl acetoacetate, as well as methallyl esters corresponding to the above allyl esters, as well as esters from such alkenyl alcohols as beta-ethyl allyl alcohol and beta-propyl allyl alcohols. Also, esters such as dimethyl maleate, diethyl maleate, diallyl maleate, dimethyl fumarate, diethyl fumarate, dimethallyl fumarate and diethyl glutaconate can be employed. Also, aliphatic nitriles such as acrylonitrile and methacrylonitrile can be employed. Obviously, mixtures of monomers can be used.

A preferred, rapid room temperature curing system employs up to 20 percent, and preferably from about 5 to 20 percent N-vinyl pyrrolidone in the vinyl monomer component; the percentage by weight being based on total weight of the vinyl crosslinking monomer. By room temperature curing is meant the curing is accomplished without the addition of external heat such as would occur at normal room temperatures, that is, from about 20° to 27° C.

With regard to the ratio of polyester to crosslinking monomer, about 40 to 70 percent by weight polyester and about 30 to 60 percent by weight aliphatic crosslinking monomer should be employed, the percentages by weight being based on total weight of the polyester and crosslinking monomer. The amount of polyester and crosslinking monomer should be varied with one another in amounts sufficient to provide liquid, flowable, interpolymerizable mixtures which cure to form strong thermoset products. If the amount of polyester is too high or the amount of crosslinking monomer too low, resins of extremely high viscosity which produce insufficiently cured products will result. On the other hand, if the amount of crosslinking monomer is too high and the amount of polyester too low, cured products with unsatisfactory properties will result.

As has been described above, the polyester and crosslinking monomer are the principal components of the resinous systems of the present invention. However, another important component is hydrated alumina filler. The hydrated alumina increases the oxygen index and decreases the flame spread of the cured resinous products of the invention. The effect of hydrated alumina on the oxygen index of cured polyester resins can be seen in FIG. 1 which, as described above, is a plot of percent hydrated alumina versus oxygen index. The graph shows that for two different polyester resins, the oxygen index goes up as the hydrated alumina content of the polyester resin goes up.

The hydrated alumina content of the polyester resin should be about 25 to 75 percent, and preferably from about 50 to 70 percent by weight, based on total weight of the polyester resin and the hydrated alumina. Amounts less than 25 percent by weight, although contributing desirable properties, do not provide the optimum fire-retardant properties desired in the products of the invention. Higher hydrated alumina contents, that is, higher than 75 percent, are undesirable because of resulting high resin viscosities.

Besides hydrated alumina, other fillers or pigments may be included in the resin formulation, although the total filler content should not exceed 80 percent by weight, based on total weight of filler and resin because of viscosity considerations. Examples of other fillers include calcium carbonate, diatomaceous earth and clay. Examples of pigments are $TiO_2$, transparent iron oxide and phthalocyanine pigments.

Polyester resins of the present invention are cured through addition polymerization of the unsaturated monomer with the unsaturation sites in the polyester molecule. This polymerization is free radical initiated. Suitable free radical addition polymerization catalysts include benzoyl peroxide, tertiary butyl perbenzoate, tertiary butyl hydroperoxide, cumine hydroperoxide, azo bis(isobutylronitrile), methyl ethyl ketone peroxide and the like. The catalyst is generally used in amounts of up to 0.1 to 2 percent by weight based on total weight of resin (polyester plus monomer); the amounts varying with the activity and amount of any accelerator and inhibitor used in the resinous system.

Accelerators are used in room temperature curing systems where it is desirable to initiate the polymerization without the application of external heat. Suitable accelerators include cobalt salts such as cobalt octoate or cobalt naphthenate. The amount of accelerator used can vary widely, but is usually within the range of 0.1 to 1 percent based on total weight of polyester resin.

To prevent any tendency for premature gelation, a gelation inhibitor may be incorporated into the polyester resin system. Suitable inhibitors are selected from the quinone and phenolic compounds and include parabenzoquinone, hydroquinone and 4-tert-butyl catechol. The amount of inhibitor required in the mixture is susceptible to wide variation but preferably is in the range of 0.001 to about 0.1 percent by weight based upon weight of the polyester component.

When the polyester resins of the present invention are used as materials of construction, such as laminating and molding resins, they can be reinforced with glass fibers or other common reinforcements such as steel wire, boron fibers, wood and vegetable fibers. However, because of strength and cost considerations, fiber glass reinforcement is preferred. Fiber glass for reinforcement of polyester resin systems is well known in the art and a detailed description of the various types of glass fibers is not considered as a necessary part of the detailed description of the present invention. If such a detailed description is desired, reference is made to *Reinforced Plastics, Theory and Procedure* by M. W. Gaylord, copyrighted 1969 by Koppers Co., Inc., pages 47–72.

In general, where the resins of the present invention are reinforced with glass, about 10 to 70 percent by weight glass fibers based on total weight of the polyester resin (polyester plus crosslinking monomer plus filler) should be used.

Besides the ingredients mentioned above, other materials may be added to the resinous mixture. Examples include mold release agents such as zinc stearate or ultraviolet light stabilizers such as o-hydroxyphenylketones, and 2-(2-hydroxyphenyl)benzotriazoles. The amounts of these other additional components are quite small and do not generally in combination exceed about 3 percent by weight of the total weight of the resinous system.

Polyester resins of the present invention are prepared by techniques well known in the art. For example, the organic unsaturated polycarboxylic acid can be mixed with the organic polyol materials and the mixture heated gradually to about 150 to about 230° C. An esterification reaction catalyst can be employed such as dibutyltin oxide. The reaction mixture is maintained within this temperature range until esterification is completed, with accompanying evolution of and evaporation of water. A solvent may be used, such as xylene or toluene, to distill azeotropically with the water of the reaction.

The polyesterification reaction can also be conducted without azeotroping agents as, for example, by means of a fusion process in which a non-reactive gas is blown through a reaction mixture in order to remove the water. Such a process is described in U.S. Pat. Nos. 3,109,831, 3,109,832 and 3,109,834.

EXAMPLES 1 – 10

A series of unsaturated polyesters cured with various unsaturated monomers, and in some cases, filled with hydrated alumina and reinforced with fiber glass were prepared. The catalyst system, time and temperatures of cure, amount and type of filler, amount of fiber glass reinforcement, as well as certain physical properties of cured resin castings are reported in Table I below.

In all cases, the polyester was an ethylene-propylene-maleateadipate. The method of preparation was as follows:

To a suitable reaction vessel equipped with a condenser, stirrer, thermometer and a source of nitrogen purging (to assist in removal of water formed in the condensation) was charged ethylene glycol, propylene glycol, maleic anhydride and adipic acid in a molar ratio of 9/2/8/2.

The charge was heated to about 100° C. to melt the maleic anhydride, after which time the reaction mixture exothermed, the highest temperature being 140° C. The reaction was continued at a temperature of 210° C. with a moderate nitrogen sparging and heat being applied to drive off water formed in the condensation. Samples were taken off periodically until the polyester attained a reduced Gardner-Holdt Viscosity of G-H, as a 60 percent solution in ethyl CELLOSOLVE. At this viscosity, the polyester had an acid number of 27–28.

At the completion of the reaction, the polyester at a temperature of about 210° C. was kept under a nitrogen atmosphere and cooled to 155° C., at which time inhibitors and modifiers were added. At about 90° C., the crosslinking agent is added to form the resin solution which is then cooled to room temperature and filtered to remove any gel particles.

Table I

| Ex. No. | % Polyester | % Methacrylate | % Comonomer | Resin/Filler Ratio | Filler | Viscosity (cps.) | % Glass | Catalyst | Cure | 934 Barcol Hardness | Oxygen Index | Smoke Density $D_m$, F-S | Modified Monsanto Tunnel Test Front | Modified Monsanto Tunnel Test Back | PSI×10³ Flexural Strength | PSI Flexural Modulus | Heat Distortion Temperature (° F) |
|---|---|---|---|---|---|---|---|---|---|---|---|---|---|---|---|---|---|
| 1 | 70 | 30 | — | 1:1 | AH | 1450 | — | BPO | 30/180° F | 57 | 35.7 | 97/268 | | | | | |
| 2 | 50 | 50 | — | 1:1 | AH | 450 | 20 | .2 VD-1 | RT | 52 | 43.4 | 72/93 | 54 | 48 | 21.02 | 13.52 | 541 |
| 3 | 50 | 25 | 25 STY | 1:1 | AH | 450 | 20 | BPO | 30/180° F | 55 | 33.0 | 159/197 | | | | | (283° C) |
| 4 | 60 | — | 40 STY | 1:1 | AH | 2450 | 20 | .2 VD-1 | RT oven | 49 | 31.2 | 319/424 | | | 17.11 | 8.98 | 592 |
| 5 | 50 | 50 | — STY | 1:1 | AH | 350 | 19 | .1 DMA 1.0 DDM 0.5 TBP | RT oven | 40 | 43.8 | 102/203 | 46.5 | 30.6 | 16.59 | 8.13 | (311° C) 532 |
| 6 | 45 | 45 | 10 EA | 1:1 | AH | 320 | 20 | 1.0 DDM BPO | 30/180° F | 42 | 46.5 | 113/166 | 41.7 | 30 | 19.12 | 11.79 | (278° C) 512 |
| 7 | 50 | 45 | 5 NPGDA | 1:1 | AH | 450 | 19 | .5 BPO .5 TBP | 30/180° F | 58 | 42.8 | 171/232 | 24.8 | 36.2 | 19.79 | 12.40 | (267° C) 570 |
| 8 | 50 | 50 | — | 1:1 | 90 AH 10 Sb₂O₃ | 980 | 20 | BPO | 30/180° F | 38 | 43.3 | 86/185 | 61 | 93 | 22.8 | 9.6 | (299° C) 494 |
| 9 | 50 | 50 | — | 1:1 | 90 AH 10 ZnB₂O₃ | 2500 | 20 | BPO | 30/180° F | 50 | 35.2 | 95/185 | 81 | 82 | 19.0 | 12.2 | (257° C) 538 |
| 10 | 46.5 | 46.5 | 7 VP | 1:1.1 | 95 AH 6 TiO₂ | 480 | 20 | .25 VD-1 1.0 P-40 | RT oven | | 46.7 | 71/116 | | | | | (281° C) |

Table II

| Ex. No. | Polyester | PE/MON | Resin/AM | Viscosity (cps.) | % Glass | Catalyst | Cure | 934 Barcol Hardness | Oxygen Index | Smoke Density F-S | Modified Monsanto Tunnel Test Front | Modified Monsanto Tunnel Test Back | PSI×10³ Flexural Strength | PSI Flexural Modulus | Heat Distortion Temperature (°F) |
|---|---|---|---|---|---|---|---|---|---|---|---|---|---|---|---|
| 11 | 10 EG/ 1 TMPDAE/ 8 MA/ 2 AD | 60/40 | 1:1 | 1250 | 20 | 2 VD-1 | RT → oven | 44 | 44.7 | 80/168 | 41.9 | 46.6 | 21.02 | 9.01 | 568 |
| 12 | " | MMA | " | 650 | 20 | " | " | 50 | 44.1 | 59/107 | 41.9 | 51.4 | 22.7 | 11.40 | 552 (298° C) |
| 13 | " | 50/50 MMA | " | 350 | 20 | 1.0 DDM | oven | 50 | 43.4 | 86/122 | — | — | 21.08 | 10.32 | (289° C) |
| 14 | " | 50/50 MMA | 1:1.5 | 1530 | 20 | BPO | oven | 37 | 57.5 | 102/152 | — | — | 18.13 | 7.50 | — |
| 15 | 10 EG/ 1 TMPDAE/ 10 MA | 50/50 MMA | 1:1 | 360 | 20 | .2 VD-1 1.0 DDM | RT | 57 | 43.0 | 87/198 | 32.4 | 32.4 | 20.6 | 12.8 | 528 (276° C) |
| 16 | 1 TMPDAE/ 11.5 PG/ 10 F | 50/50 MMA | 1:1 | 290 | 20 | BPO | oven | 55 | 36.1 | 12/175 | 48 | 60 | 23.94 | 15.23 | 500 (260° C) |
| 17 | " | 50/50 MMA | 1:1.5 | 1100 | 20 | BPO | oven | 55 | 53.1 | 151/126 | 31 | 39 | 22.08 | 20.60 | 545 (285° C) |
| 18 | " | " | " | " | " | .2 VD-1 1.0 P-40 | 30/180° F 30/250° F oven | 51 | 57.9 | 57/152 | 28 | 31 | 19.7 | 16.14 | 545 (285° C) |
| 19 | " | 45/55 MMA | " | 360 | " | 1.0 P-40 BPO | oven | 52 | 48.8 | 106/146 | 24 | 44 | 18.21 | 16.46 | 525 (274° C) |
| 20 | " | 50/43 MMA/ 7 VP | " | 7000 | " | .5 VD-1 1.0 P-40 | RT | 52 | 52.4 | 116/121 | 43 | 43 | 13.32 | 9.40 | 525 (274° C) |

The percentages of polyester, methyl methacrylate and comonomer are percentages by weight based on total weight of polyester, methyl methacrylate and comonomer.

With regard to the comonomers, the abbreviations in Table I stand for:

STY = styrene
EA = ethyl acrylate
NPGDA = neopentyl glycol diacrylate
VP = N-vinyl pyrrolidone The resin/filler ratio is by weight.

The viscosity is measured in a Brookfield Viscometer at 25° C. using a No. 2 spindle at 20 rpm.

The type of fiber glass used for reinforcement was 2 ounce chopped strand mat and the percentage by weight is based on total weight of resin (including filler) and fiber glass.

BPO represents benzoyl peroxide.
TBP represents tertiary butyl perbenzoate.
VD-1 represents cobalt octoate.
P-40 represents PERCADOX 40 (Noury Chem.) described as a pentanedione peroxide.

Unless otherwise indicated, 1 percent by weight catalyst is used.

DMA is dimethyl aniline.

An oven cure is generally at about 120° C. for about 15 minutes. RT means room temperature cure.

Barcol is a measure of hardness determined by a 934 Barcol Impressor. It is a comparable measure of hardness using a scale of values of 0 to 100, and the higher the number, the harder the material.

OI is oxygen index, determined according to ASTM D-2863. $D_m$ represents smoke density. F represents a flaming sample and S represents a smoldering sample. Smoke density is determined according to ASTM D-2843.

In the Modified Monsanto Tunnel Test, a sample 23¾ inches by 3¾ inches is slanted at an angle of about 45° from the horizontal. A specified heat source is burned at the bottom of the sample and the sample then burned for four minutes. The flame spread, a function of distance and time, is then compared with a sample of redwood and a flame spread rating is reported. The test is similar to ASTM E-286, part 14 (1974). Flame spreads for the front (F) and back (B) surfaces are reported.

The flexural strength and modulus is determined according to ASTM D-790.

The heat distortion temperature is determined according to ASTM D-648.

Some significant observations from the examples presented in Table I above are as follows.

By comparing Examples 1 and 2 at similar filler loading, the oxygen index of the cured resin increases as the level of methyl methacrylate is increased and polyester decreased. Although the polyester in Example 3 is kept at the same level as in Example 2, one-half of the methacrylate was substituted with styrene. This produced rather substantial changes since the oxygen index decreased unexpectedly while the smoke density increased very sharply. In a totally styrene thinned experiment (Example 4), the filled resin had a very high viscosity in comparison to Example 1 due to the poor solubility of this type of polyester in styrene compared to methyl methacrylate, while the cured resin again showed a very low oxygen index and a very high smoke density.

The use of comonomers with methyl methacrylate can be carried out without greatly affecting the oxygen index of the system. Thus, ethyl acrylate and vinyl pyrrolidone can be used to give faster reactivity with the polyester and better overall cure without contributing greatly to the oxygen index or smoke density (Examples 6 and 10). Where a difunctional monomer is used, such as in Example 7, the increase in the crosslinking density renders more thermal stability to the system as exemplified by a higher heat distortion temperature and a lower flame spread than in Example 5. The oxygen index remained almost unchanged although the smoke density increased. Even at this level, this system has a lower smoke density than styrene based systems and a higher oxygen index.

In Examples 8 and 9, other fire-retardant additives such as antimony oxide and zinc borate can be incorporated and yet maintain a low smoke density system. Their use, however, does not really reflect any dramatic improvements in the oxygen index or the flame spread rating.

EXAMPLES 11 - 20

A second series of unsaturated polyesters cured for the most part with methyl methacrylate were prepared. The principal variant in this series of polyesters was the formulation of the polyester itself. The polyester formulation, the catalyst systems, time and temperature of cure, amount and type of filler, amount of fiber glass reinforcement, as well as certain physical properties are reported in Table II above.

In the examples, the abbreviations for the polyesters are as follows:

EG = ethylene glycol
PG = propylene glycol
TMPDAE = trimethylol propane diallyl ether
F = fumaric acid
MA = maleic anhydride
AD = adipic acid The polyesters were prepared in a manner generally described above in Examples 1-10, that is, all the ingredients were charged to a suitable reaction vessel equipped with a condenser, stirrer and a source of nitrogen purging. The reactants were heated to initiate an exotherm and the reaction continued with heating and nitrogen sparging to drive off water.

At the completion of the polyesterification, the polyester is cooled to about 155° C. under a nitrogen atmosphere at which time catalyst promoters and inhibitors, if used, are usually added. At about 90° C., a crosslinking agent is added to form the resin solution which is then cooled to room temperature and filtered to remove any gel particles.

The abbreviations used in Table II have the same significance as described above in connection with Table I.

Some significant observations from the data presented in Table II above are as follows.

The resins of Examples 16-20 are formed from highly unsaturated polyesters giving the potential for more complete and room temperature cures. However, with highly unsaturated polyesters such as propylene-fumarate resins, the oxygen indices are relatively low. See Example 16 in which a propylene-fumarate resin at a 1:1 filler ratio has an oxygen index of 36. This oxygen index should be compared with the one obtained with an ethylene-propylene-maleate-adipate polyester such as is shown in Example 5 in which the oxygen index is 43.8. The oxygen index of the propylene-fumarate resin can be improved if the hydrated alumina level is increased.

See Examples 16 and 17; however, note also that the viscosity increases.

The effects of benzoyl peroxide on smoke density can be seen by comparing Example 17 with Example 18. Example 17 contains benzoyl peroxide and Example 18 employs a catalyst system of pentanedione peroxide and cobalt octoate promoter. Benzoyl peroxide, being aromatic, appears to contribute significantly to the smoke density, whereas the aliphatic catalyst system of Example 18 appears to have minimal effect on the smoke density. Also, the benzoyl peroxide of Example 17 is applied as a slurry in tricresyl phosphate which also is aromatic and contains phosphate groups which are believed to contribute significantly to smoke density.

EXAMPLES 21 – 27

The following examples show the dramatic effect of N-vinyl pyrrolidone on accelerating curing so as to be able to achieve room temperature cures.

EXAMPLE 21

An ethylene-propylene-maleate-adipate polyester was prepared as generally described in Examples 1-10. The polyester was blended with methyl methacrylate to form a 1:1 weight ratio of polyester to methyl methacrylate. The resin was filled with aluminum hydrate in a 1:1 weight ratio and cured at room temperature with a catalyst system consisting of one percent by weight pentanedione peroxide and 0.2 percent by weight cobalt octoate promoter; the percentages by weight being based on resin weight. The resin gelled in 19.75 minutes and reached a peak exotherm of 119° C. when 100 gram quantity was placed in a 150 milliliter glass beaker and placed in a 66° C. bath with mild agitation.

EXAMPLE 22

Example 21 was repeated with the exception that 0.2 percent by weight dimethyl para-toluidiene was used in the catalyst system. The gel time was reduced to 5.5 minutes but the peak exotherm was only 100° C. indicating an incomplete cure.

EXAMPLE 23

A resin system similar to Example 21 was prepared from the following charge:

| Component | Percent by Weight |
| --- | --- |
| Polyester + Methyl Methacrylate (50/50) | 47.5 |
| N-vinyl pyrrolidone | 2.5 |
| TiO$_2$ | 2.0 |
| Hydrated alumina | 50.0 |

As in Example 21, the catalyst system was one percent pentanedione peroxide and 0.2 percent cobalt octoate. The gel test results are shown in Table III below.

EXAMPLES 24 – 27

Resin systems similar to Example 23 were prepared from the following charges:

| Example No. | 24 | 25 | 26 | 27 |
| --- | --- | --- | --- | --- |
| polyester + methyl methacrylate | 47.5 | 46.5 | 46.5 | 46.5 |
| N-vinyl pyrrolidone | 2.5 | 3.5 | 3.5 | 3.5 |
| TiO$_2$ | 2.0 | 2.0 | 2.0 | 2.0 |
| hydrated alumina | 50 | 50 | 50 | 50 |
| cobalt octoate[1] | 0.1 | 0.1 | 0.05 | 0.2 |
| pentanedione peroxide[1] | 1.0 | 1.0 | 1.0 | 1.0 |

| Example No. | 24 | 25 | 26 | 27 |
| --- | --- | --- | --- | --- |
| DMPT[1] | | | 0.01 | |

[1]Percent by weight based on resin weight.

Table III

| Example No. | 23 | 24 | 25 | 26 | 27 |
| --- | --- | --- | --- | --- | --- |
| gel time, minutes at 66° C. | 0.78 | 2.00 | 1.45 | 7.90 | 0.75 |
| total time | 1.30 | 3.42 | 2.42 | 11.60 | 1.25 |
| peak temperature, ° F. | 282 | 264 | 269 | 221 | 282 |

EXAMPLES 28 – 34

Hydrated alumina has a pronounced effect on oxygen index. Higher hydrated alumina loadings result in a higher oxygen indices. This is seen in FIG. 1 which is a plot of oxygen index versus percent hydrated alumina content of two different polyester resins.

Plot A represents an ethylene-propylene-maleate-adipate polyester prepared as generally described in Examples 1–10 in a molar ratio of 9/8/2.

Plot B represents a propylene-fumarate polyester prepared as generally described in Examples 16 through 20 in a molar ratio of 11.5/10.

The polyesters were combined with 50 percent by weight of methyl methacrylate; the percentages by weight being based on total weight of polyester and methyl methacrylate, and filled with aluminum hydrate in the various percentages shown in FIG. 1; the percentages by weight being based on total weight of polyester resin and hydrated alumina.

The filled resins were laminated with two layers of 2 ounce chopped strand mat and cured at 82° C. for 30 minutes using 1 percent benzoyl peroxide as the catalyst. After curing, the laminates were evaluated for oxygen index according to ASTM D-2863.

EXAMPLES 35 – 41

In order to develop adequate strength, the aliphatic polyesters of the present invention cured with aliphatic monomer, must be highly unsaturated. Strength as a function of the percentage unsaturation is shown in FIGS. 2, 3 and 4. The resins evaluated for the data shown in FIGS. 2, 3 and 4 were prepared by blending 50 parts by weight polyester with 50 parts by weight methyl methacrylate, 7 parts by weight N-vinyl pyrrolidone and 0.5 parts by weight cobalt octoate and 1.0 part by weight pentanedione peroxide.

The polyesters used in preparing the various resins were prepared from the following charges:

| Component | Mole Ratios | | | | | |
| --- | --- | --- | --- | --- | --- | --- |
| maleic anhydride | 10 | 9 | 8 | 7 | 6 | 5 | 4 |
| adipic acid | | 1 | 2 | 3 | 4 | 5 | 6 |
| ethylene glycol | 9 | 9 | 9 | 9 | 9 | 9 | 9 |
| propylene | 2 | 2 | 2 | 2 | 2 | 2 | 2 |

The polyesters and resultant resins were prepared as generally described in Examples 1–10.

The resultant resins were cast in a 12 inch by 12 inch by 1/8 inch closed cell and allowed to gel at room temperature followed by a one-half hour post cure at 82° C. After curing, the resin castings were released from the cell and evaluated for flexural strength and modulus according to ASTM D-790 and for Barcol hardness using a 934 Barcol Impressor.

We claim:

1. A curable aliphatic polyester resin, suitable for molding and laminating, being essentially free of aromatic constituents comprising a mixture of:
   A. an unsaturated aliphatic polyester derived from polycondensing:
      1. organic polyols having a functionality of at least 2,
      2. organic polycarboxylic acids having a functionality of at least 2 in which the unsaturated component of the unsaturated polyester is an alpha, beta-ethylenically unsaturated polycarboxylic acid and the equivalent ratio of alpha, beta-ethylenically unsaturated polycarboxylic acid to all other polycarboxylic acid components in the polyester is at least 1 to 1; and
   B. an aliphatic vinyl monomer which is a lower alkyl ester containing 1 to 4 carbon atoms of methacrylic or acrylic acid and which is copolymerizable with said polyester,
   C. at least 50 percent by weight hydrated alumina, the percentage by weight being based on total weight of (A), (B) and (C), said composition capable of being completely cured to produce strong thermoset articles of construction which, when burned, produce little smoke.

2. The composition of claim 1 which contains:
   A. from 20 to 80 percent unsaturated aliphatic polyester, and
   B. from 80 to 20 percent aliphatic monomer,
the percent by weight being based on total weight of unsaturated polyester and aliphatic monomer.

3. The composition of claim 1 in which the alpha, beta-ethylenically unsaturated polycarboxylic acid is maleic acid or its anhydride, or fumaric acid.

4. The composition of claim 1 in which the organic polycarboxylic acid component contains an acyclic saturated polycarboxylic acid or anhydride containing from 2 to 10 carbon atoms.

5. The composition of claim 4 which contains:
   A. from 0 to 50 equivalent percent of an acyclic saturated polycarboxylic acid or anhydride containing from 2 to 10 carbon atoms, and
   B. from 50 to 100 equivalent percent of an alpha, beta-ethylenically unsaturated polycarboxylic acid or its anhydride.

6. The composition of claim 1 in which the polyol component includes alcohols or polyols containing allylic or acrylic unsaturation.

7. The composition of claim 6 which includes trimethylol propane diallyl ether.

8. The composition of claim 1 in which the polyol component is an alkylene glycol or an alkylene oxide glycol containing from 2 to 10 carbon atoms.

9. The composition of claim 1 in which the polyol component contains in part a polyol having a functionality greater than 2.

10. The composition of claim 1 in which the aliphatic monomer contains a fully esterified polyol.

11. The composition of claim 1 in which the aliphatic monomer includes in part N-vinyl pyrrolidone.

12. The composition of claim 1 which further includes antimony oxide.

13. The composition of claim 1 which contains:
    A. 75 to 25 percent by weight aliphatic polyester resin; and
    B. 25 to 75 percent by weight hydrated alumina,
the percentages by weight being based on total weight of aliphatic polyester resin and hydrated alumina.

14. The composition of claim 13 which further includes about 10 to 70 percent by weight glass fibers; the percentage by weight being based on total weight of aliphatic polyester resin, hydrated alumina and fiber glass.

15. The composition of claim 1 in a cured, crosslinked state.

16. The composition of claim 14 in a cured, crosslinked state.

* * * * *

UNITED STATES PATENT AND TRADEMARK OFFICE
CERTIFICATE OF CORRECTION

PATENT NO. : 4,041,008

DATED : August 9, 1977

INVENTOR(S) : Joseph M. Makhlouf and Earl E. Parker

It is certified that error appears in the above-identified patent and that said Letters Patent are hereby corrected as shown below:

Column 14, Table II, heading of 4th column, "Resin/AM" should be --Resin/AH--.

Column 14, Table II, 6th entry under column entitled "Smoke Density F-S", "12/175" should be --112/175--.

Signed and Sealed this

First Day of November 1977

[SEAL]

Attest:

RUTH C. MASON
Attesting Officer

LUTRELLE F. PARKER
Acting Commissioner of Patents and Trademarks